W. W. SLOANE.
STORAGE BATTERY LOCOMOTIVE.
APPLICATION FILED DEC. 8, 1919.
1,337,334.
Patented Apr. 20, 1920.
3 SHEETS—SHEET 3.
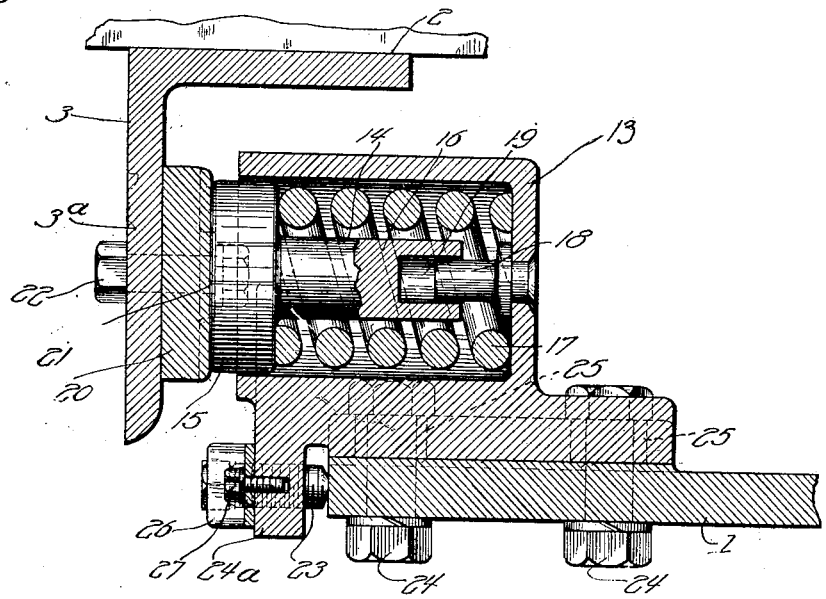
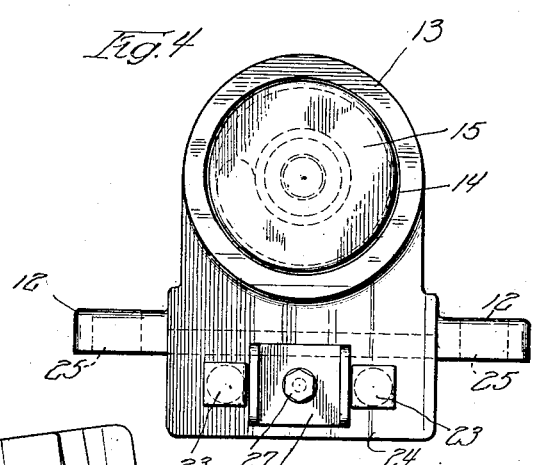
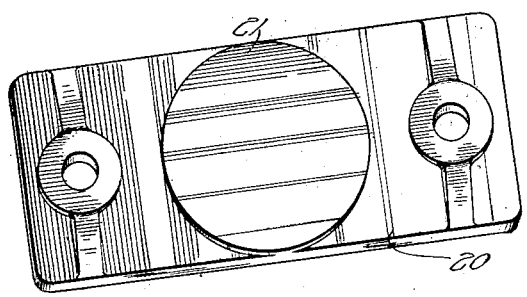
Inventor
William W. Sloane
by Clarence J. Poole Atty

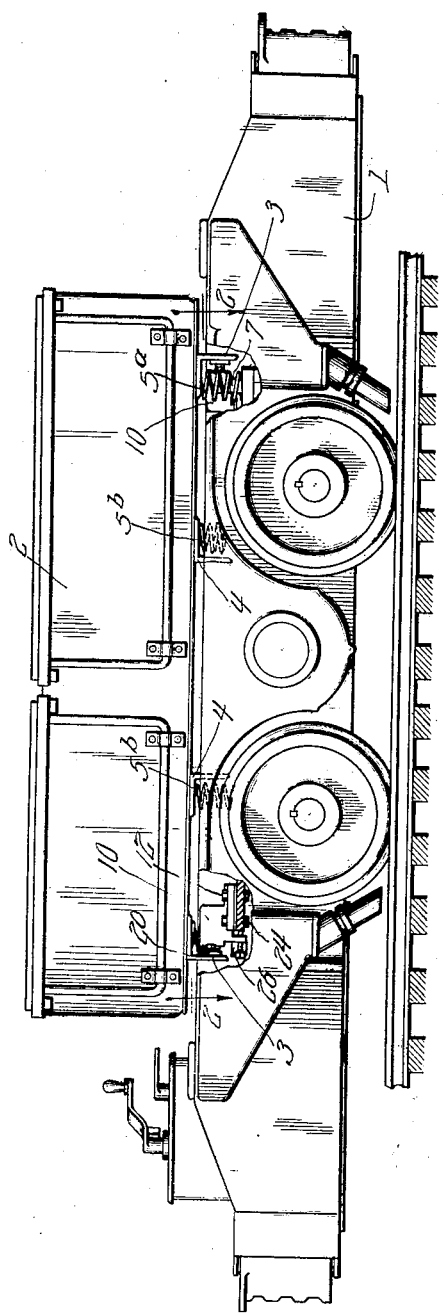

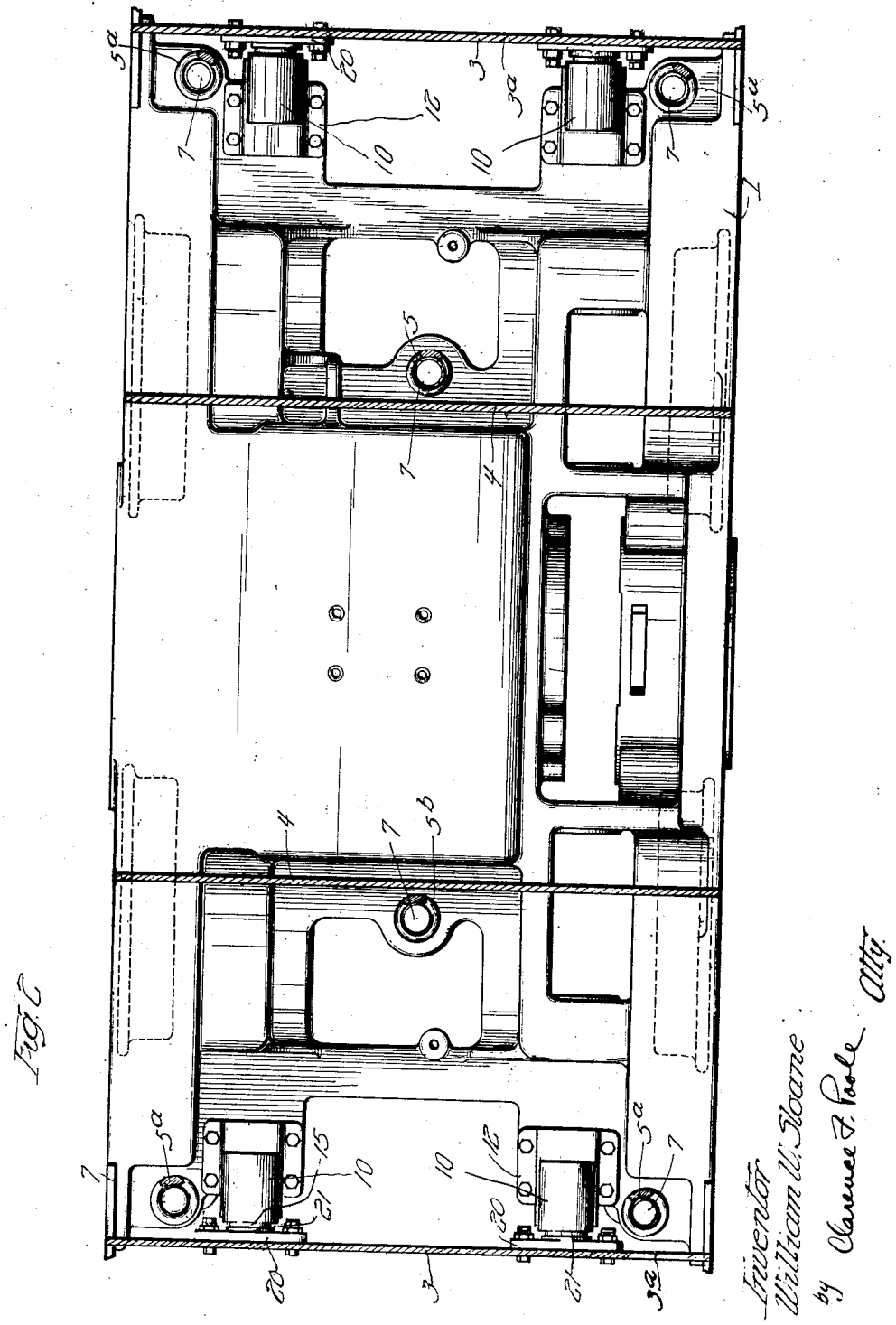

UNITED STATES PATENT OFFICE.

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

STORAGE-BATTERY LOCOMOTIVE.

1,337,334.  Specification of Letters Patent.  Patented Apr. 20, 1920.

Application filed December 8, 1919. Serial No. 343,200.

*To all whom it may concern:*

Be it known that I, WILLIAM W. SLOANE, a citizen of the United States, residing at Chicago, in the county of Cook and State of Illinois, have invented an Improvement in Storage-Battery Locomotives, of which the following is a specification.

This invention relates to improvements in suspension devices for storage battery box adapted for use on electric locomotives.

The object of this invention is to provide a resilient suspension for the battery box to protect the battery cells from breakage due to vibration and shocks incurred during the operation of the locomotive.

A further object of this invention is to provide a spring suspension for the battery box whereby the recoil of the springs is checked, and excessive periodic movements of the springs are eliminated.

I am aware that it is the common practice to provide vehicle bodies with spring suspensions, and also with so-called "shock-absorbers," but I have found that such a construction affords insufficient protection to the batteries of a locomotive inasmuch as the body of the locomotive is constantly subject to direct shocks incurred during car coupling and similar operations incident to the work of haulage locomotives, which shocks would ordinarily be transmitted to a battery box mounted rigid with respect to the locomotive body. Accordingly in carrying out my invention, I provide a novel construction whereby the battery box is supported on the locomotive frame by an independent resilient suspension device.

The invention consists in the construction, combination and location of parts as will be hereinafter more fully set forth, as shown in the accompanying drawings, and pointed out in the appended claims.

Referring to the drawings, Figure 1 illustrates a locomotive in side elevation with portions of the side frame broken away to show the arrangement of the suspension apparatus. Fig. 2 is an enlarged top plan sectional view taken on line 2—2 of Fig. 1 with the ends of the locomotive broken away, showing the details and arrangement of the suspension device as applied to the locomotive frame. Fig. 3 is an enlarged fragmentary vertical cross sectional view showing details of the shock absorber and its relation to the locomotive frame and the battery box. Fig. 4 is an end view of the shock absorber. Fig. 5 is a detailed view, in perspective, of the friction pad adapted to be mounted on the battery box frame, and to contact with the shock absorber.

In the drawings, 1 indicates an electric locomotive body or frame, having a storage battery box or compartment 2, mounted thereon. The bottom of the battery box is provided with two inverted L-shaped bars 3, 3, extending transversely of the box and near each end thereof, and two similar L-shaped bars 4, 4, intermediate the ends of the box, as shown. Helical supporting spring $5^a$, $5^a$, are located adjacent each end of, and under, the L bars 3, 3, and similar helical springs $5^b$, $5^b$, are located adjacent the center of the L bars 4, 4. Retaining pins 7, 7, extending upwardly from the frame, are provided to maintain the springs $5^a$, $5^a$, and $5^b$, $5^b$, in position. The arrangement is such that the entire weight of the battery box is supported on the springs $5^a$, $5^a$, and $5^b$, $5^b$.

In order to protect the battery box from endwise shocks, and also to check the recoil of the main suspension springs above described, a plurality of shock absorbers 10, 10, are provided, one of each preferably located adjacent to each spring $5^a$, $5^a$, and adapted to have frictional engagement with the depending flanges $3^a$, $3^a$, of the L bars 3, 3. Each shock absorber comprises a base member 17, seated on the frame member 1, and having lateral flanges 12, 12, and a horizontally disposed spring housing 13, opened at one end, as shown. A plunger 14, having a head portion 15, and reduced shank portion 16, is inserted in the spring housing, and a spring 17, in said housing bears against the rear face of the head portion 15. A guide pin 18, is mounted in the rear end of the housing and extends into a recess 19, formed in the shank 16, of the plunger 14.

The flange $3^a$, attached to the battery box, is provided with a bearing plate or pad 20, having a bearing surface 21, which is arranged to engage with the face of the piston 14. Said bearing plate is attached to the flange $3^a$, by any suitable means such as bolts 22, 22. In order to allow for adjustment of tension on the spring 17, the shock absorbers 10, 10, are provided with two adjusting screws 23, 23, extending through a downwardly extending flange $24^a$, and adapted to bear on the supporting frame. Said shock absorbers are attached to said frame by bolts 24, 24, which pass through slots 25, 25, in the lateral flanges 12, 12. This construction permits the shock absorbers 10, 10, to be adjusted longitudinally to afford the desired amount of tension against the bearing plate 20. A lock for the adjusting screws 23, 23, is also provided consisting of a U shaped member 26, mounted between said adjusting screws and having upwardly extending flanges adapted to engage the side faces on the heads of said screws to hold the same from turning. A suitable lock-screw 27, retains the locking member 26, in place against the flange 24ª.

It will be seen from the above description that a locomotive constructed in accordance with my invention provides a construction in which the storage battery is protected from undue shocks incident to the operation of the locomotive. The construction whereby the batteries are independently supported by springs, allows the use of springs having greater resiliency than would be the case if the springs are designed to support the entire weight of the locomotive. Furthermore, my device can be used to advantage on a locomotive of the type shown in Patent No. 873,442 to N. D. Levin in which the usual type of springs are omitted from the running gear, and the trucks are pivoted directly to the locomotive frame.

The arrangement of the shock absorbers serve the dual purpose of cushioning the longitudinal shocks, or end thrusts, of the locomotive, and also, by frictional contact with the flanges of the battery box, to check the recoil of the vertical spring action and any excessive displacement of the battery box. On account of the large relative mass of the battery box and batteries, the friction devices serve to eliminate excessive periodic movements of the battery box, which may be sufficient to cause breakage of the springs, displacement of the box, or an objectionable "teetering" or side sway of the entire locomotive, which tends to derail the same.

Having described my invention, what I claim as new and desire to cover by Letters Patent is:

1. In combination with a locomotive frame, a storage battery box, resilient suspension means supporting said storage battery on said locomotive frame, and means yieldably restraining the movement of said storage battery box in all directions.

2. In combination with a locomotive frame, a storage battery box, resilient suspension means supporting said battery box on said frame, and means independent of said resilient suspension means yieldably restraining the movement of said battery box.

3. In combination with a locomotive frame, a storage battery box, resilient suspension means supporting said storage battery on said locomotive frame, and means independent of said resilient suspension means yieldably restraining the movement of said storage battery box in all directions.

4. In combination with a locomotive frame, a storage battery box, a plurality of vertical acting springs supporting said storage battery box on said locomotive, and means independent of said springs for checking the recoil of said springs.

5. In combination with a locomotive frame, a storage battery box, resilient suspension means supporting said battery box on said locomotive frame, and a friction device coacting between said battery box and locomotive frame.

6. In combination with a locomotive frame, a storage battery box, resilient suspension means supporting said battery box on said locomotive frame, and a resilient friction device coacting between said battery box and locomotive frame.

7. In combination with a locomotive frame, a storage battery box, resilient suspension means supporting said storage battery box on said locomotive frame, said supporting means comprising a plurality of vertically acting springs, and a friction device coacting between said battery box and locomotive frame.

8. In combination with a locomotive frame, a storage battery box, resilient suspension means supporting said storage battery box on said locomotive frame, said supporting means comprising a plurality of vertically acting springs, and a resilient friction device coacting between said battery box and locomotive frame.

9. In combination with a locomotive frame, a storage battery box, a plurality of springs for supporting said battery box on said locomotive frame, a resilient friction device coacting between said battery box and said locomotive frame, and means for adjusting the tension of said friction device.

10. In combination with a locomotive frame, a storage battery box, a plurality of springs for supporting said battery box on said locomotive frame, and a pair of oppositely disposed resilient friction devices coacting between said battery box and said locomotive frame.

11. In combination with a locomotive frame, a storage battery box, a plurality of springs for supporting said battery box on said locomotive frame, a pair of oppositely disposed resilient friction devices coacting between said battery box and said locomotive frame, and means for adjusting the tension of said friction devices.

12. In combination with a locomotive frame, a storage battery box, a plurality of springs for supporting said battery box on said locomotive frame, a resilient friction device mounted on said frame, and having frictional engagement with a portion of said battery box, said friction device comprising a spring, a friction member mounted on said spring, and a housing for said spring.

13. In combination with a locomotive frame, a storage battery box, a plurality of springs for supporting said battery box on said frame, a resilient friction device mounted on said frame, and having frictional engagement with a portion of said battery box, said frictional device comprising a spring, a friction member mounted on each spring, a housing for said spring, and means for adjusting the position of said housing on said frame.

14. In combination with a locomotive frame, a storage battery box, a plurality of springs for supporting said battery box on said frame, a resilient friction device mounted on said frame, and a bearing plate mounted on said battery box and adapted to have frictional engagement with said friction device.

15. In combination with a locomotive frame, a storage battery box, a plurality of springs for supporting said battery box on said frame, a resilient friction device mounted on said frame, a bearing plate mounted on said battery box and adapted to have frictional engagement with said friction device, and means for adjusting the position of said housing on said frame.

WILLIAM W. SLOANE.